United States Patent [19]
O'Connell

[11] 3,962,825
[45] June 15, 1976

[54] HOLDER FOR SUPPORTING FLOWER ARRANGEMENTS

[75] Inventor: Donald L. O'Connell, Port Chester, N.Y.

[73] Assignee: Floral Innovations, Inc., Port Chester, N.Y.

[22] Filed: Jan. 20, 1975

[21] Appl. No.: 542,123

[52] U.S. Cl. .............................. 47/41.12; 47/41 R; 248/27.8; D35/3 A
[51] Int. Cl.² ............................................ A01G 5/04
[58] Field of Search ................ 47/37, 38.1, 34, 38, 47/41–42; 248/17, 27.8; 206/423; D35/3 A

[56] References Cited
UNITED STATES PATENTS

| | | | |
|---|---|---|---|
| 1,063,395 | 6/1913 | Scribner | 47/38.1 X |
| 1,231,976 | 7/1917 | Weitzel | 47/38.1 |
| 2,150,550 | 3/1939 | Keller | 47/41.12 |
| 2,781,651 | 2/1957 | Cutler | 47/41 X |
| 2,784,529 | 3/1957 | Prestigiacomo | 47/38 |
| 2,891,354 | 6/1959 | Smithers | 47/41.2 |
| 2,964,877 | 12/1960 | Gauding | 47/38.1 |
| 2,994,985 | 8/1961 | Jackson, Jr. | 47/41.12 X |
| 3,003,284 | 10/1961 | Smithers | 47/41.12 |
| 3,125,255 | 3/1964 | Kaiser | D35/3 A |
| 3,142,935 | 8/1964 | Campos | 47/41 |
| 3,201,900 | 8/1965 | King | 47/41.12 |
| 3,290,820 | 12/1966 | Aebersold | 47/41.12 |
| 3,368,303 | 2/1968 | Tong | 47/41.12 |
| 3,651,601 | 3/1972 | La Montagne | 47/41.12 |

FOREIGN PATENTS OR APPLICATIONS

| | | | |
|---|---|---|---|
| 631,119 | 10/1892 | Germany | 47/38.1 |
| 1,292,802 | 10/1972 | United Kingdom | 47/38.1 |

*Primary Examiner*—Edgar S. Burr
*Assistant Examiner*—James R. Feyrer
*Attorney, Agent, or Firm*—Laurence B. Dodds

[57] ABSTRACT

A holder for a foam block for supporting flower arrangements comprises a hollow tray-like base member forming a water-confining receptacle for supporting a foam block. The upper wall of the receptacle has one or more apertures for draining excess water from the foam block into the receptacle. To this end, such upper wall has a central drainage aperture and a plurality of ridges extending radially from the aperture to support the block and sloping toward the aperture to facilitate drainage. The holder further includes means for holding the foam block in a position to be supported by the base member. This holding means may be in the form of a plurality of elongated fastening members or stirrups shaped to engage the upper face and the side faces of the foam block to support it laterally. The upper wall of the base member has a plurality of perforations adjacent the opposite sides of a foam block disposed thereon and the lower extremities of the stirrups detachably engage such perforations. There is also provided an auxiliary water reservoir disposed on the upper surface of the foam block and held in place by the stirrups. This reservoir has a restricted air inlet aperture and a plurality of spaced outlet apertures in contact with the upper face of the foam block for feeding water thereto primarily by gravity.

9 Claims, 3 Drawing Figures

HOLDER FOR SUPPORTING FLOWER ARRANGEMENTS

BACKGROUND OF THE INVENTION

1. Field of the Invention

The flower holder of the present invention is of general application but is particularly suited for use by florists in making formal flower arrangements for use at weddings, funerals and other public occasions.

2. Description of the Prior Art

A common form of holder for floral arrangements, particularly such arrangements by professional florists, comprises a decorative dish-like open tray on which, or in which, is disposed a block of plastic foam material into which the stems of the flowers are inserted. The foam block is usually saturated with water to prevent wilting of the flowers. An example of such a holder is disclosed in U.S. Pat. No. 3,127,698 to Smithers. A common shortcoming of prior flower holders of such type is that there is a tendency to super-saturate the foam block with water, with the result that the excess water accumulates in the open tray which is subject to sloshing about and spilling over its edges during handling of the holder, particularly during delivery by the florist.

SUMMARY OF THE INVENTION

In accordance with the invention, a holder for a foam block for supporting flower arrangements comprises a hollow tray-like base member forming a water-confining receptacle for supporting a foam block, the upper wall of such receptacle having one or more apertures for draining excess water from the foam block into the receptacle, and a plurality of elongated fastening members shaped to engage and laterally support the foam block and detachably engageable with the base member.

Further in accordance with the invention, a holder for a foam block for supporting flower arrangements comprises a base member for supporting a foam block, means for holding the foam block in a position to be supported by such base member, and an auxiliary water reservoir having one or more restricted apertures for feeding water slowly to the foam block and so positioned relative to the foam block that water is fed thereto primarily by gravity.

DESCRIPTION OF THE DRAWINGS

FIG. 1a is a cross-sectional detail view of the cap of the auxiliary water reservoir of the holder of FIG. 1.

DESCRIPTION OF THE PREFERRED EMBODIMENT

Figure 1:
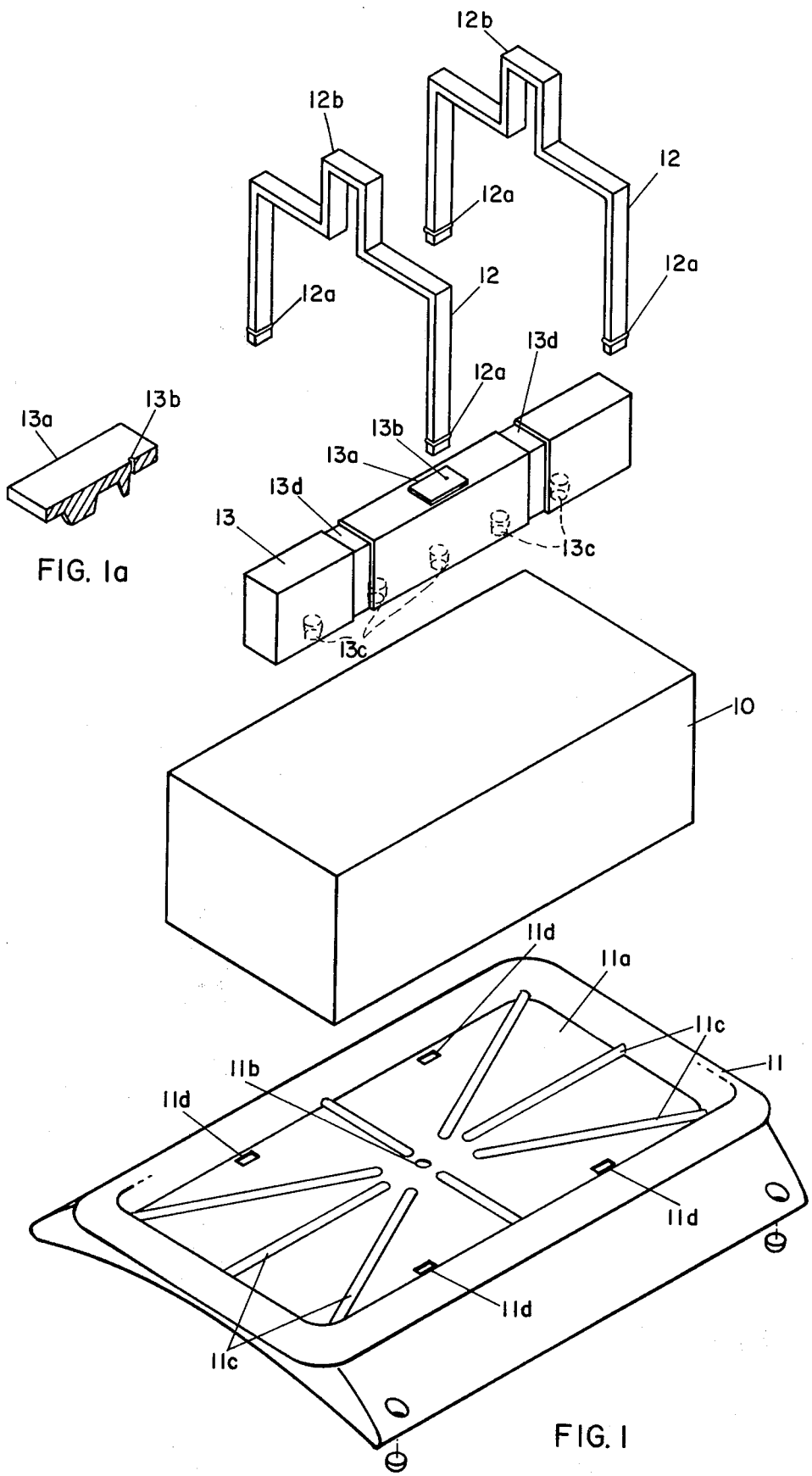
FIG. 1 is an exploded perspective view of a holder for a foam block for supporting flower arrangements in accordance with the invention.
Figure 2:
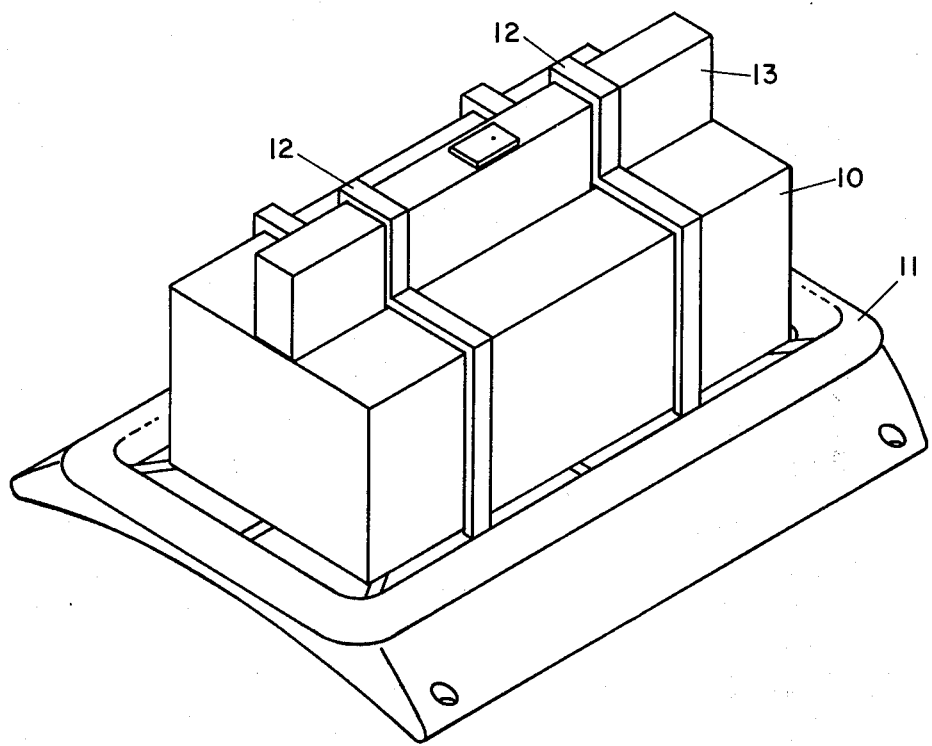
FIG. 2 is a perspective view of the assembled flower holder.

Referring now to FIG. 1 of the drawings, there is illustrated a holder for a foam block 10 for supporting flower arrangements. This holder comprises a hollow tray-like base member 11 forming a water-confining receptacle supporting the block 10. The upper wall 11a of the receptacle slopes to a central aperture 11b for draining excess water from the foam block into the base member 11. Better to support the foam block 10, there are provided a series of ridges 11c extending in directions radially from the aperture 11b.

The flower holder also includes means for holding the foam block in a position to be supported by the base member, preferably in the form of a plurality of elongated fastening members or stirrups 12,12 which are shaped to engage the upper and side faces of the foam block 10 to provide lateral support therefor. The extremities of the stirrups 12 are provided with slight enlargements 12a which, upon assembly of the elements, engage apertures 11d in the upper wall of the base member 11 with a press fit or snap engagement.

Optionally, the flower holder of the invention may include an auxiliary water reservoir 13 which has one or more restricted apertures for feeding water slowly to the foam block. As shown in the drawings, the reservoir 13 is disposed to rest on the upper face of the foam block 10. The reservoir 13 is provided with a filling cap 13a in which is a pinhole 13b constituting a restricted air inlet which restricts the outflow of water through the series of apertures 13c in the lower wall of the reservoir. As shown, the stirrups 12 have upwardly extending U-shaped portions 12b adapted to engage recesses 13d in the walls of the reservoir 13 to retain it in position.

In the use of the flower holder of the invention, a foam block 10 is initially saturated with water. If the water reservoir 13 is used, it is filled and put in place on the upper surface of the foam block and the stirrups 12,12 placed over the reservoir 13 and the foam block 10 with their extremities engaging the apertures 11d in the upper wall 11a of the receptacle 11. The stirrups 12 firmly engage the upper and side faces of the block 10, thereby minimizing breakup of the block upon the insertion of flower stems. The restricted air inlet 13b retards the flow of water by gravity from the reservoir 13 through the apertures 13c so that it approximately compensates for loss of water by evaporation from the foam block and by the inserted flower stems. At the same time, any excess water which may drain from the block 10 flows between the ridges 11c and aperture 11b into the receptacle 11 where it is confined and prevented from spilling over into areas surrounding the holder.

It will be obvious that if the use of the reservoir 13 is not desired, the U-shaped extensions 12b of stirrups 12 will be omitted. If it is desired to use the water reservoir 13 in some instances and not in others, the U-shaped extensions 12b of the stirrups 12 may be omitted, the recesses 13d in the reservoir wall shown in FIG. 1 omitted and replaced by similar recesses in the lower wall of the reservoir into which the upper cross-pieces of the stirrups 12,12 may be snapped or press fitted.

While there has been described what is, at present, considered to be the preferred embodiment of the invention, it will be apparent to those skilled in the art that various changes and modifications may be made therein, without departing from the invention, and it is, therefore, aimed in the appended claims to cover all such changes and modifications as fall within the true spirit and scope of the invention.

What is claimed is:

1. A holder for a foam block for supporting flower arrangements comprising:
   a hollow double-wall, tray-like member forming a water-confining receptacle for supporting a foam block, the upper wall of said receptacle having at least one aperture for draining excess water from the foam block into the receptacle;

and means for retaining the foam block in a desired position on said member.

2. A holder for a foam block for supporting flower arrangements comprising:

a base member for supporting a foam block;

means for holding the foam block in a position to be supported by said base member;

and an auxiliary water reservoir having one or more restricted apertures for feeding water slowly to the foam block and so positioned relative to the foam block that water is fed thereto primarily by gravity.

3. A holder for a foam block for supporting flower arrangements in accordance with claim 2 in which said reservoir has a restricted air inlet aperture and a plurality of spaced outlet apertures in contact with at least one surface of the foam block.

4. A holder for a foam block for supporting flower arrangements comprising:

a hollow tray-like base member forming a waterconfining receptacle for supporting a foam block, the upper wall of said receptacle having at least one aperture for draining excess water from the foam block into the receptacle;

and a plurality of elongated fastening members shaped to engage and laterally support the foam block and detachably engageable with the base member.

5. A holder for a foam block for supporting flower arrangements in accordance with claim 4 in which the at least one aperture is in the upper wall of said receptacle and comprises a central drainage aperture toward which said upper wall slopes and a plurality of block-supporting ridges extending in directions radially from said aperture.

6. A holder for a foam block for supporting flower arrangements in accordance with claim 4 in which each of said fastening members is in the form of a stirrup engaging the upper face and the sides of the foam block.

7. A holder for a foam block for supporting flower arrangements in accordance with claim 6 in which said upper wall has a plurality of perforations adjacent the opposite sides of a foam block disposed thereon and in which the lower extremities of said stirrups detachably engage said perforations.

8. A holder for a foam block for supporting flower arrangements in accordance with claim 4 which includes an auxiliary water reservoir disposed on the upper surface of a foam block and held in place by said fastening members.

9. A holder for a foam block for supporting flower arrangements in accordance with claim 8 in which said reservoir has a restricted air inlet aperture and a plurality of spaced outlet apertures for feeding water to the foam block.

* * * * *